(12) United States Patent
Aguirre et al.

(10) Patent No.: US 10,187,920 B2
(45) Date of Patent: Jan. 22, 2019

(54) METHOD AND DEVICE FOR INCREASED BANDWIDTH UTILIZING AGGREGATION MODE AND CHANNEL SELECTION MECHANISM

(71) Applicant: Verizon Patent and Licensing Inc., Arlington, VA (US)

(72) Inventors: Sergio Aguirre, Southlake, TX (US); Parvez Ahmad, Fremont, CA (US); Wai Shun Wilson Wong, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 15/346,241

(22) Filed: Nov. 8, 2016

(65) Prior Publication Data
US 2018/0132288 A1  May 10, 2018

(51) Int. Cl.
*H04W 24/08* (2009.01)
*H04W 76/15* (2018.01)
*H04L 5/00* (2006.01)
*H04L 27/00* (2006.01)

(52) U.S. Cl.
CPC ............ *H04W 76/15* (2018.02); *H04L 5/001* (2013.01); *H04L 5/0032* (2013.01); *H04L 5/0044* (2013.01); *H04L 5/0064* (2013.01); *H04L 5/0091* (2013.01); *H04L 27/0006* (2013.01); *H04W 24/08* (2013.01); *H04L 5/006* (2013.01)

(58) Field of Classification Search
CPC ...... H04L 5/001; H04L 1/0026; H04L 1/1854; H04W 72/0486; H04W 24/10; H04W 52/281
See application file for complete search history.

(56) References Cited

U.S. PATENT DOCUMENTS

2003/0043732 A1* 3/2003 Walton ............... H04L 1/0009
                                                    370/208
2008/0220788 A1* 9/2008 Stanwood ............ H04L 5/0007
                                                    455/450

(Continued)

OTHER PUBLICATIONS

3GPP, "Carrier Aggregation Explained," http://www.3gpp.org/technologies/keywords-acronyms/101-carrier-aggregation-explained, Jun. 15, 2013, 5 pages.

(Continued)

*Primary Examiner* — Romani Ohri

(57) ABSTRACT

A device may receive information related to a channel. The information may indicate whether a measurement related to the channel satisfies a threshold. The threshold may be related to an availability of the channel. The device may determine an aggregation mode to use to communicate via the channel. The device may determine a set of available channels based on determining whether the measurement satisfies the threshold. The device may determine an order related to the set of available channels based on determining the set of available channels. The order may be based on the availability of the set of available channels. The device may select a channel from the set of available channels based on the order related to the set of available channels. The device may exchange communications via the channel based on selecting the channel.

20 Claims, 7 Drawing Sheets

(56) References Cited

U.S. PATENT DOCUMENTS

| | | | | |
|---|---|---|---|---|
| 2012/0088533 | A1* | 4/2012 | Khoshnevis | H04L 1/0026 455/509 |
| 2012/0170507 | A1* | 7/2012 | Sawai | H04B 7/0413 370/315 |
| 2014/0050093 | A1* | 2/2014 | Liu | H04W 28/0205 370/235 |
| 2015/0133184 | A1* | 5/2015 | Sadek | H04W 16/14 455/552.1 |
| 2016/0226629 | A1* | 8/2016 | Liu | H04L 1/1861 |
| 2017/0367115 | A1* | 12/2017 | Sebire | H04W 72/1284 |
| 2018/0132209 | A1* | 5/2018 | Shimezawa | H04W 72/042 |

OTHER PUBLICATIONS

Wikipedia, "LTE in unlicensed spectrum," https://en.wikipedia.org/wiki/LTE_in_unlicensed_spectrum, Oct. 16, 2016, 3 pages.
Wikipedia, "LTE-WAN Aggregation," https://en.wikipedia.org/wiki/LTE-WLAN_Aggregation, Oct. 3, 2016, 3 pages.
Wikipedia, "U-NII," https://en.wikipedia.org/wiki/U-NII, Jun. 12, 2016, 4 pages.
Wikipedia, "Antenna gain," https://en.wikipedia.org/wiki/Antenna_gain, Oct. 4, 2016, 6 pages.
Wikipedia, "Equivalent isotropically radiated power," https://en.wikipedia.org/wiki/Equivalent_isotropically_radiated_power, Oct. 28, 2016, 2 pages.
Wikipedia, "Isotropic radiator," https://en.wikipedia.org/wiki/Isotropic_radiator, Sep. 29, 2016, 4 pages.
Wikipedia, "Received signal strength indication," https://en.wikipedia.org/wiki/Received_signal_strength_indication, Nov. 5, 2016, 2 pages.
Wikipedia, "Radio frequency," https://en.wikipedia.org/wiki/Radio_frequency, Oct. 30, 2016, 5 pages.
3GPP, "Release 13," http://www.3gpp.org/release-13, May 25, 2016, 2 pages.
3GPP, "Release 14," http://www.3gpp.org/release-14, Jan. 16, 2016, 1 page.

* cited by examiner

METHOD AND DEVICE FOR INCREASED BANDWIDTH UTILIZING AGGREGATION MODE AND CHANNEL SELECTION MECHANISM

BACKGROUND

Long-term evolution (LTE) in unlicensed spectrum (LTE-U) was developed for the use of radio communications technology, such as the 5 gigahertz (GHz) band used by dual-band Wi-Fi equipment. LTE-U serves as an alternative to carrier-owned Wi-Fi hotspots, and allows wireless carriers to boost coverage in their wireless networks by using the unlicensed 5 GHz band already populated by Wi-Fi devices. LTE-wireless local area network (WLAN) aggregation (LWA) is a specification developed by the third Generation Partnership Project (3GPP) in an effort to standardize operation of LTE in the Wi-Fi bands. In addition, license assisted access (LAA) is a 3GPP effort to standardize operation of LTE in the Wi-Fi bands. In some cases, LWA and/or LAA may permit the use of an unlicensed frequency spectrum to offload data from a licensed spectrum.

DETAILED DESCRIPTION OF PREFERRED EMBODIMENTS

Figure 1A:
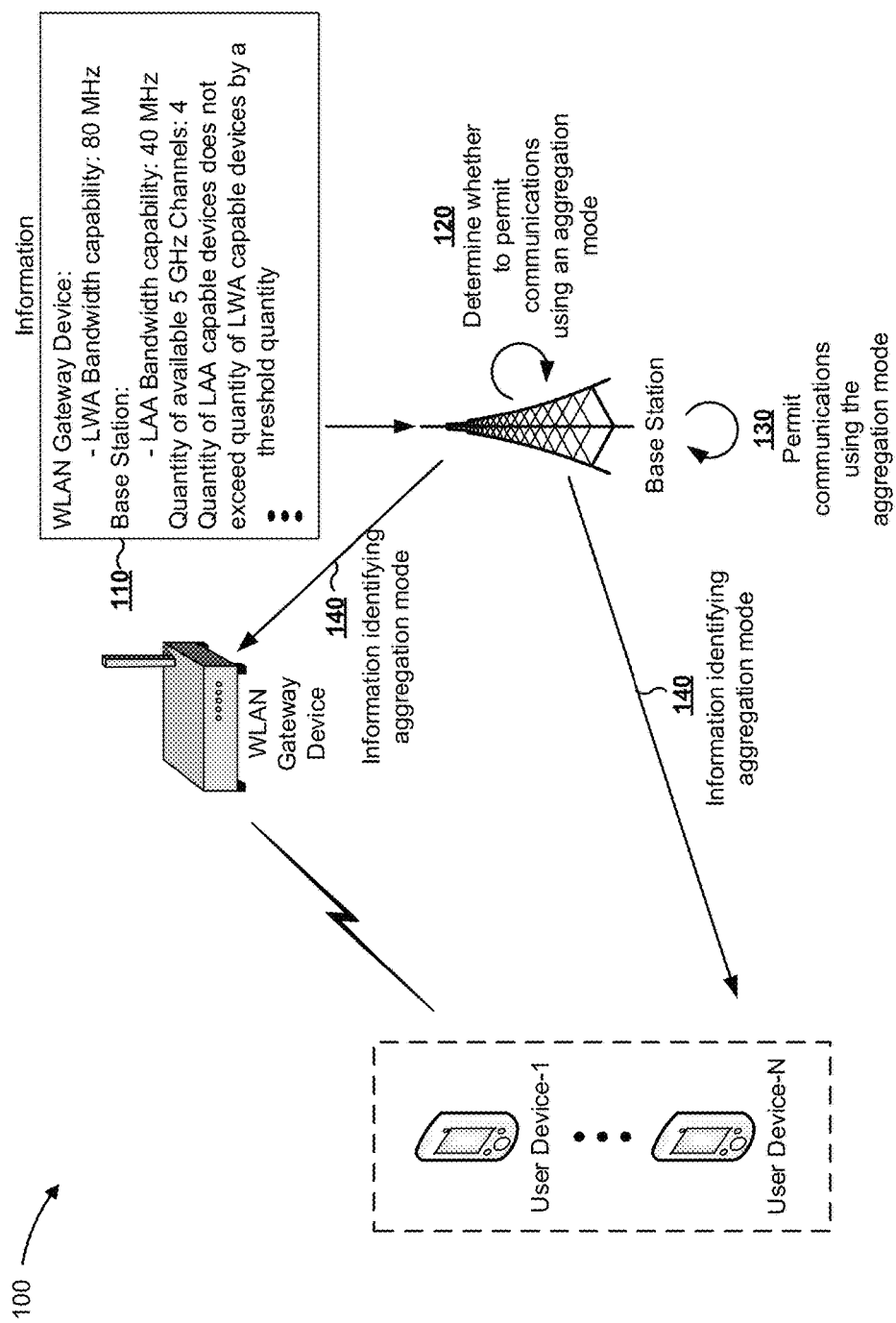
FIGS. 1A and 1B are diagrams of an overview of an example implementation described herein.

The following detailed description of example implementations refers to the accompanying drawings. The same reference numbers in different drawings may identify the same or similar elements.

In a network, a base station may use unlicensed frequency spectrum (e.g., via use of license assisted access (LAA) and/or long-term evolution-wireless local area network aggregation (LWA)) for communications in order to accommodate an increased demand for bandwidth and/or an increased amount of data. In some instances, use of LAA and/or LWA may be preferred, for example, due to spectral efficiency, frequency range/bandwidth supported, a coverage area, and/or a traffic capacity of LAA and/or LWA. For example, LWA may be preferred relative to LAA because LWA may support a wider bandwidth compared to LAA. On the other hand, LAA may be preferred relative to LWA because LAA may have better spectral efficiency, better coverage, better capacity, and/or a more efficient air interface, such as less overhead (e.g., fewer symbols in a frame or subframe), support of closed loop link adaptation, and/or use of hybrid automatic repeat request (HARM). In some cases, the base station may lack a technique for determining whether to use LAA and/or LWA.

To communicate, the base station may select a channel of the unlicensed frequency spectrum to use to communicate. In some instances, the base station may have to select a channel in the unlicensed frequency spectrum in a manner that ensures that communications to/from the base station do not interfere with other communications via the unlicensed frequency spectrum. For example, use of LAA and/or LWA by the base station may have to be compatible with other technologies that use the unlicensed frequency spectrum (e.g. Wi-Fi). In some cases, the base station may lack a technique for selecting a channel where, for example, the technique reduces or eliminates interference with communications via another channel.

In addition, the base station may communicate using an antenna (e.g., a directional antenna or an omnidirectional antenna). In some cases, a particular antenna may be preferred, such as when the device is designed primarily for indoor use or outdoor use. The antenna may radiate power and may have to operate in an environment that includes a variety of other wireless devices. In some instances, the radiated power of the antenna may cause interference with the other devices. In addition, the amount of interference caused by the antenna may be based on the type of antenna (e.g., whether the antenna is a directional antenna or an omnidirectional antenna).

To prevent interference with other devices, the radiated power may have to satisfy a threshold amount of radiated power for a particular radio band or another specification. For example, a public or private entity, such as the Federal Communications Commission (FCC), may specify a rule or specification related to interference with the other devices. In some cases, the base station may lack a technique for satisfying a rule or a specification related to an amount of radiated power and/or interference with other wireless devices.

Implementations described herein permit a base station to dynamically select an aggregation mode (e.g., an LAA aggregation mode that uses LAA or an LWA aggregation mode that uses LWA) based on information related to a device and/or a channel of a frequency spectrum. In addition, the base station may select a channel to use to communicate based on information related to the channel. In this way, the base station increases a traffic capacity and/or a coverage area of a network. In addition, this reduces channel selection time, thereby increasing channel scanning efficiency and reducing latency, delay, and/or packet loss. Further, this improves data throughput of a network and/or spectral efficiency of a channel by offloading traffic from one frequency spectrum to another frequency spectrum. Further, this improves communications by dynamically prioritizing a selection of channels to use to communicate based on information related to the channel, including information related to an amount of radiated power permitted when communicating via the channel.

Figure 1B:
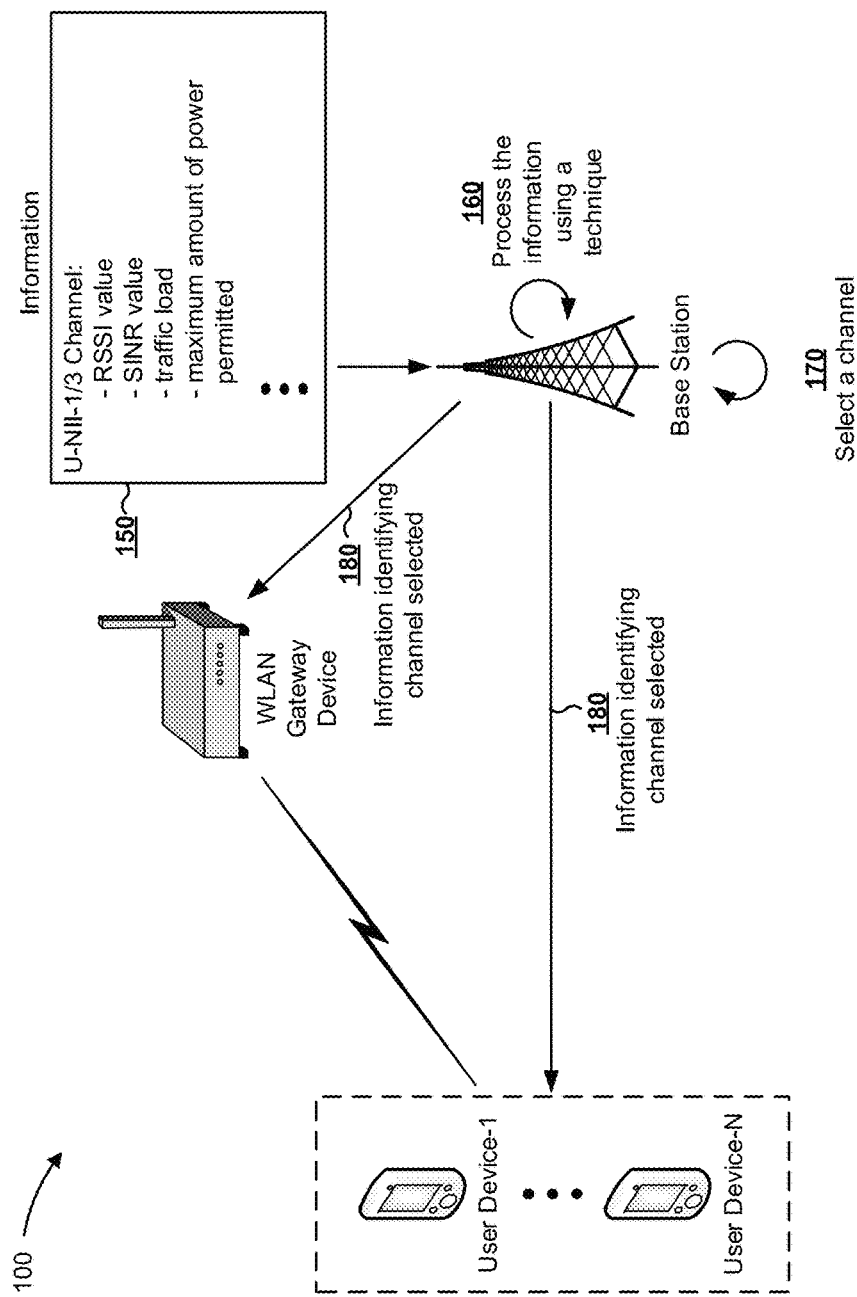

FIGS. 1A and 1B are diagrams of an overview of an example implementation 100 described herein. Example implementation 100 includes a base station, a WLAN gateway device, and user device-1 through user device-N (N≥1) (herein collectively referred to as "user devices," and individually as "user device").

As shown in FIG. 1A, and by reference number 110, the base station may receive information associated with a bandwidth capability of the WLAN gateway device, the base station, and/or the user devices, a relationship between quantities of devices with different capabilities, and/or a quantity of available channels in a frequency spectrum. For example, the information may identify that the WLAN gateway device has an LWA bandwidth capability of 80 megahertz (MHz) and that the base station has an LAA bandwidth capability of 40 MHz. In addition, and continuing with the previous example, the information may identify that there are four available 5 GHz channels, totaling 80 MHz of bandwidth, for use by the base station, the user devices, and/or the WLAN gateway device. Further, and continuing with the previous example, the information may identify that a quantity of LAA capable devices does not exceed a quantity of LWA capable devices by a threshold quantity.

In some implementations, an available channel may be identified using a threshold. For example, a base station may identify a channel as being available based on a measurement value related to the channel satisfying a threshold. Additionally, or alternatively, an available channel may be identified relative to other channels (e.g., the relative quality of various channels). For example, a base station may identify a channel as being more available relative to other channels based on a score that is determined using various measurement values related to the channel (as described in more detail elsewhere herein), even if the channel is occupied by traffic and/or the measurement values related to the channel do not satisfy a threshold.

As shown by reference number 120, the base station may determine whether to permit communications using an aggregation mode based on the received information (e.g., whether to enable an LAA aggregation mode or an LWA aggregation mode). For example, the base station may determine whether to permit communications using a particular aggregation mode based on the bandwidth capabilities of the base station, the user devices, and/or the WLAN gateway device, the relationship between the quantities of devices with different bandwidth capabilities, and/or the quantity of channels available.

Continuing with the previous example, the base station may determine to permit communications using the LWA aggregation mode based on the WLAN gateway device having more bandwidth capability relative to the LAA bandwidth capability of the base station. In addition, and continuing still with the previous example, the base station may determine to permit communications using the LWA aggregation mode based on four channels of 5 GHz being available, thereby permitting all 80 MHz of the LWA bandwidth capability of the WLAN gateway device to be used and thereby reducing or eliminating unused bandwidth. Further, the base station may determine to permit communications using the LWA aggregation mode based on the quantity of LAA capable devices failing to exceed the quantity of LWA capable devices by a threshold quantity.

As shown by reference number 130, the base station may permit communications using the aggregation mode (e.g., by configuring a setting of the base station). For example, the base station may permit communications using the LWA aggregation mode by configuring a setting of the base station. As shown by reference number 140, the base station may provide information to other devices (e.g., the user devices and/or the WLAN gateway device) to indicate that the base station has determined to permit communications using the aggregation mode and that the other devices are to operate in the aggregation mode. For example, the base station may provide information to the other devices to indicate that the base station has enabled the LWA aggregation mode and that the other devices are to operate in the LWA aggregation mode.

As shown in FIG. 1B, and by reference number 150, the base station may receive information related to a channel of a frequency spectrum. For example, the base station may receive information related to a channel of an unlicensed national information infrastructure (U-NII) radio band, such as a U-NII-1 radio band and/or a U-NII-3 radio band of the 5 GHz frequency spectrum. In some cases, the base station may receive information based on performing a measurement or receiving a message from another device that includes the information. In addition, the information may relate to multiple channels. As further shown by reference number 150, the information related to the channel may indicate a received signal strength indicator (RSSI) value for the channel, a signal-to-interference-plus-noise ratio (SINR) value for the channel, a traffic load for the channel, a maximum amount of radiated power permitted when communicating via channel, and/or the like.

As shown by reference number 160, the base station may process the received information using a technique, such as a technique that processes information related to various channels and ranks the channels for selection based on the information satisfying a threshold value, based on a score determined using the information, and/or the like, as described in more detail elsewhere herein. In some implementations, and as an example of a technique, the base station may determine, based on the RSSI value, the SINR value, and/or other information, whether a channel is available for selection. A channel, with a value that satisfies a pre-defined threshold value, may be considered an available channel for selection. The base station may determine a set of available channels and the base station may rank each channel in the set of available channels (e.g., according to a traffic load on the channel, according to a proximity of the channel to a Wi-Fi occupied channel or an otherwise unavailable channel, randomly, and/or the like).

Additionally, or alternatively, and as another example of a technique, the base station may use information related to an RSSI value for the channel, an amount of traffic on the channel, an amount of radiated power permitted when communicating via the channel, and/or other information related to the channel or a radio band with which the channel is associated. The base station may determine a score for the channel based on the RSSI value, the amount of traffic on the channel, and/or the amount of radiated power permitted when communicating via the channel. The base station may compare the score for the channel to a score for another channel to determine whether to select the channel or the other channel to use to communicate.

As shown by reference number 170, the base station may select a channel to use to communicate. For example, the base station may select a channel with a higher rank or a higher score relative to another channel based on processing the received information. As shown by reference number 180, the base station may provide information to the user devices and/or the WLAN gateway device that identifies the channel selected.

In this way, a base station may dynamically select an aggregation mode (e.g., an LAA aggregation mode or an LWA aggregation mode) based on information related to a device and/or a channel. In addition, the base station may select a channel to use to communicate based on information related to the channel. This increases a traffic capacity and/or a coverage area of a network. In addition, this reduces channel selection time, thereby increasing channel scanning efficiency and reducing latency, delay, and/or packet loss. Further, this improves data throughput of a network and/or spectral efficiency of a channel by offloading traffic from one frequency spectrum to another frequency spectrum. Further, this improves communications by dynamically prioritizing a selection of channels to use to communicate.

As indicated above, FIGS. 1A and 1B are provided merely as an example. Other examples are possible and may differ from what was described with regard to FIGS. 1A and 1B.

Figure 2:
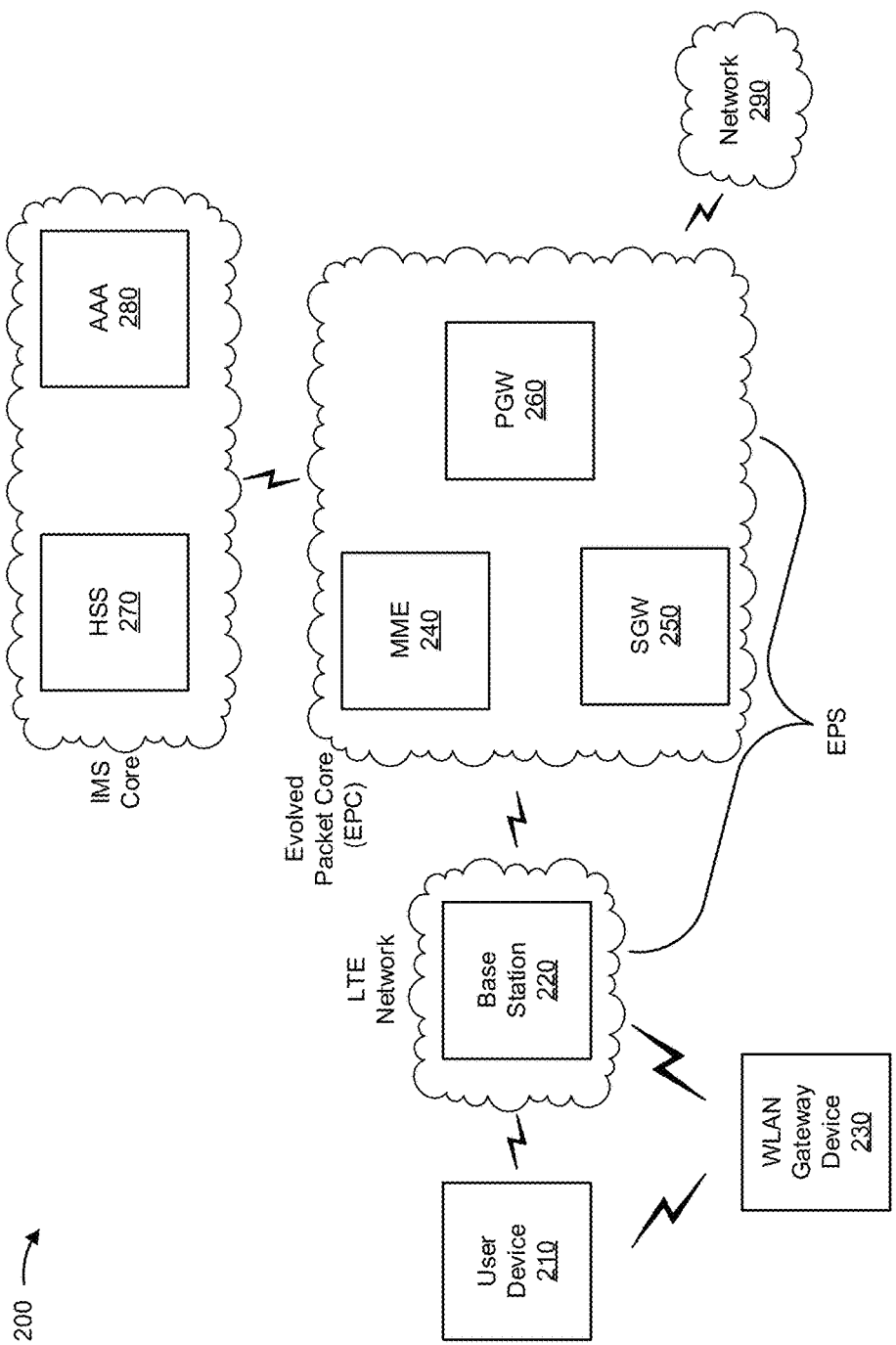
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a base station 220, a wireless local area network (WLAN) gateway device 230, a mobility management entity device (MME) 240, a serving gateway (SGW) 250, a packet data network gateway (PGW) 260, a home subscriber server (HSS) 270, an authentication, authorization, and accounting server (AAA) 280, and a network 290. Devices of environment 200 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network, a fourth generation (4G) network, or a fifth generation (5G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 220 that take the form of evolved Node Bs (eNBs) via which user device 210 communicates with the EPC. The EPC may include SGW 250 and/or PGW 260 that enable user device 210 to communicate with network 290 and/or an internet protocol (IP) multimedia subsystem (IMS) core. The IMS core may include HSS 270 and AAA 280, and may manage device registration and authentication, session initiation, etc., associated with user device 210. HSS 270 and/or AAA 280 may reside in the EPC and/or the IMS core.

User device 210 includes one or more devices capable of receiving, generating, storing, processing, and/or providing information associated with an aggregation mode in which user device 210 can operate. For example, user device 210 may include a communication and/or computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, user device 210 may provide, to base station 220, information associated with an aggregation mode in which user device 210 can operate, as described elsewhere herein. Additionally, or alternatively, user device 210 may receive, from base station 220, information indicating that user device 210 is to operate using the aggregation mode and/or information indicating a particular channel via which user device 210 is to communicate, as described elsewhere herein.

Base station 220 includes one or more devices capable of transferring traffic, such as audio, video, text, and/or other traffic, destined for and/or received from user device 210. In some implementations, base station 220 may include an eNB associated with the LTE network that receives traffic from and/or sends traffic to network 290 via SGW 250 and/or PGW 260. Additionally, or alternatively, one or more base stations 220 may be associated with a RAN that is not associated with the LTE network. Base station 220 may send traffic to and/or receive traffic from user device 210 via an air interface. In some implementations, base station 220 may include a small cell base station, such as a base station of a microcell, a picocell, and/or a femtocell.

WLAN gateway device 230 includes one or more devices capable of communicating wirelessly with local devices, such as user device 210, and providing connectivity, for local devices, to other devices (e.g., base station 220). For example, WLAN gateway device 230 may include a gateway, a WLAN access point, a router, a modem, a switch, a hub, a bridge, or a similar type of device. In some implementations, WLAN gateway device 230 may enable user device 210 to connect to and/or communicate with base station 220, such as during use of an aggregation mode, as described elsewhere herein.

MME 240 includes one or more devices (e.g., network devices), such as one or more server devices, capable of managing authentication, activation, deactivation, and/or mobility functions associated with user device 210. In some implementations, MME 240 may perform operations relating to authentication of user device 210. Additionally, or alternatively, MME 240 may facilitate the selection of a particular SGW 250 and/or a particular PGW 260 to serve traffic to and/or from user device 210. MME 240 may perform operations associated with handing off user device 210 from a first base station 220 to a second base station 220 when user device 210 is transitioning from a first cell associated with the first base station 220 to a second cell associated with the second base station 220. Additionally, or alternatively, MME 240 may select another MME (not pictured), to which user device 210 should be handed off (e.g., when user device 210 moves out of range of MME 240).

SGW 250 includes one or more devices (e.g., network devices) capable of routing traffic. For example, SGW 250 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 250 may aggregate traffic received from one or more base stations 220 associated with the LTE network, and may send the aggregated traffic to network 290 (e.g., via PGW 260) and/or other network devices associated with the EPC and/or the IMS core. SGW 250 may also receive traffic from network 290 and/or other network devices, and may send the received traffic to user device 210 via base station 220. Additionally, or alternatively, SGW 250 may perform operations associated with handing off user device 210 to and/or from an LTE network.

PGW 260 includes one or more devices (e.g., network devices) capable of providing connectivity for user device 210 to external packet data networks (e.g., other than the depicted EPC and/or LTE network). For example, PGW 260 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 260 may aggregate traffic received from one or more SGWs 250, and may send the aggregated traffic to network 290. Additionally, or alternatively, PGW 260 may receive traffic from network 290, and may send the traffic to user device 210 via SGW 250 and base station 220. PGW 260 may record data usage information (e.g., byte usage, packet usage, etc.), and may provide the data usage information to AAA 280.

HSS 270 includes one or more devices (e.g., network devices), such as one or more server devices, capable of managing (e.g., receiving, generating, storing, processing, and/or providing) information associated with user device 210. For example, HSS 270 may manage subscription information associated with user device 210, such as information that identifies a subscriber profile of a user associated with user device 210, an account type associated with a user of user device 210, information that identifies services and/or applications that are accessible to user device 210, location information associated with user device 210, a network identifier (e.g., a network address) that identifies user device 210, information that identifies a treatment of user device 210 (e.g., quality of service information, a quantity of minutes allowed per time period, a quantity of data consumption allowed per time period, etc.), and/or similar information. HSS 270 may provide this information to one or more other devices of environment 200 to support the operations performed by those devices.

AAA 280 includes one or more devices (e.g., network devices), such as one or more server devices, that perform authentication, authorization, and/or accounting operations for communication sessions associated with user device 210. For example, AAA 280 may perform authentication operations for user device 210 and/or a user of user device 210 (e.g., using one or more credentials), may control access, by user device 210, to a service and/or an application (e.g., based on one or more restrictions, such as time-of-day restrictions, location restrictions, single or multiple access restrictions, read/write restrictions, etc.), may track resources consumed by user device 210 (e.g., a quantity of voice minutes consumed, a quantity of data consumed, etc.), and/or may perform similar operations.

Network 290 includes one or more wired and/or wireless networks. For example, network 290 may include a cellular network (e.g., a long-term evolution (LTE) network, a code division multiple access (CDMA) network, a 3G network, a 4G network, a 5G network, another type of advanced generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
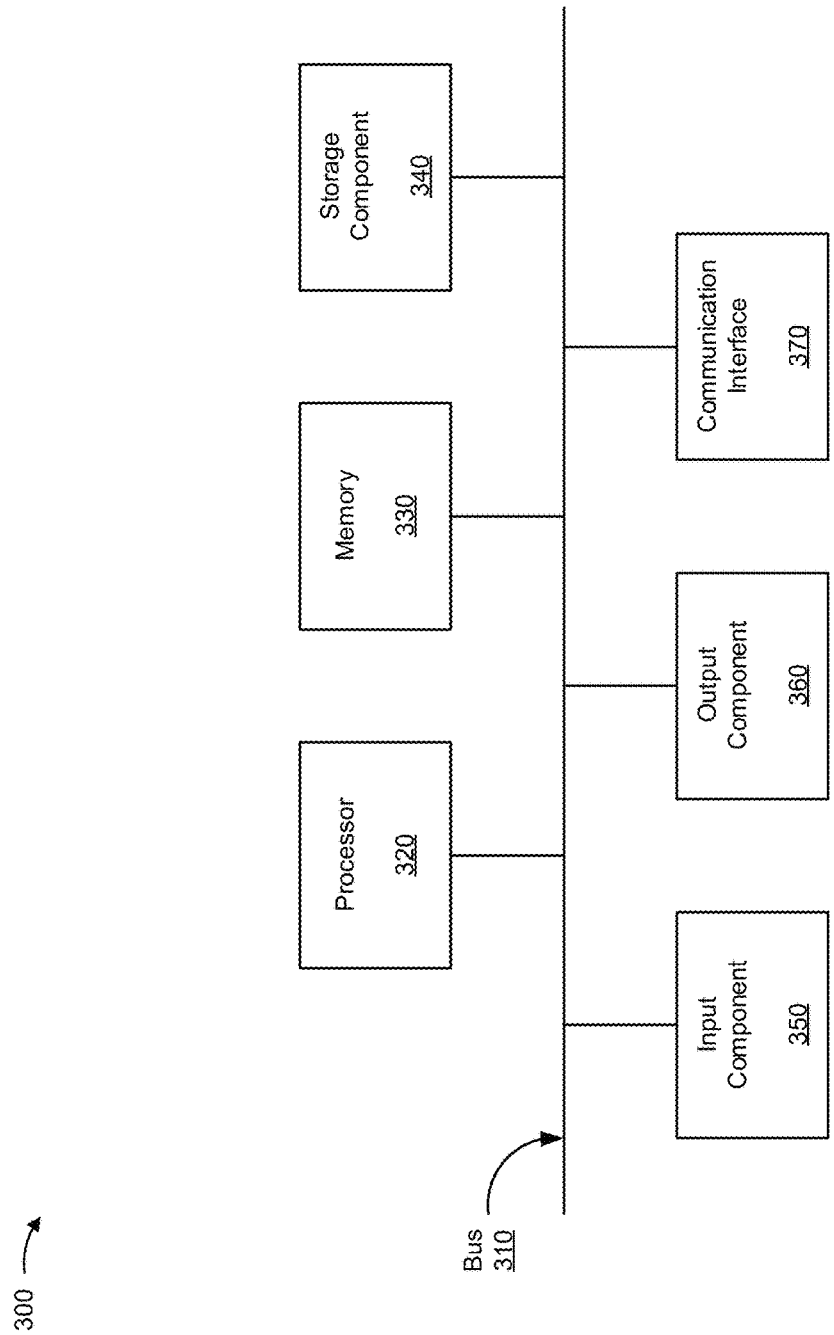
FIG. 3 is a diagram of example components of one or more devices of FIG. 2.

FIG. 3 is a diagram of example components of a device 300. Device 300 may correspond to user device 210, base station 220, WLAN gateway device 230, MME 240, SGW 250, PGW 260, HSS 270, and/or AAA 280. In some implementations, user device 210, base station 220, WLAN gateway device 230, MME 240, SGW 250, PGW 260, HSS 270, and/or AAA 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
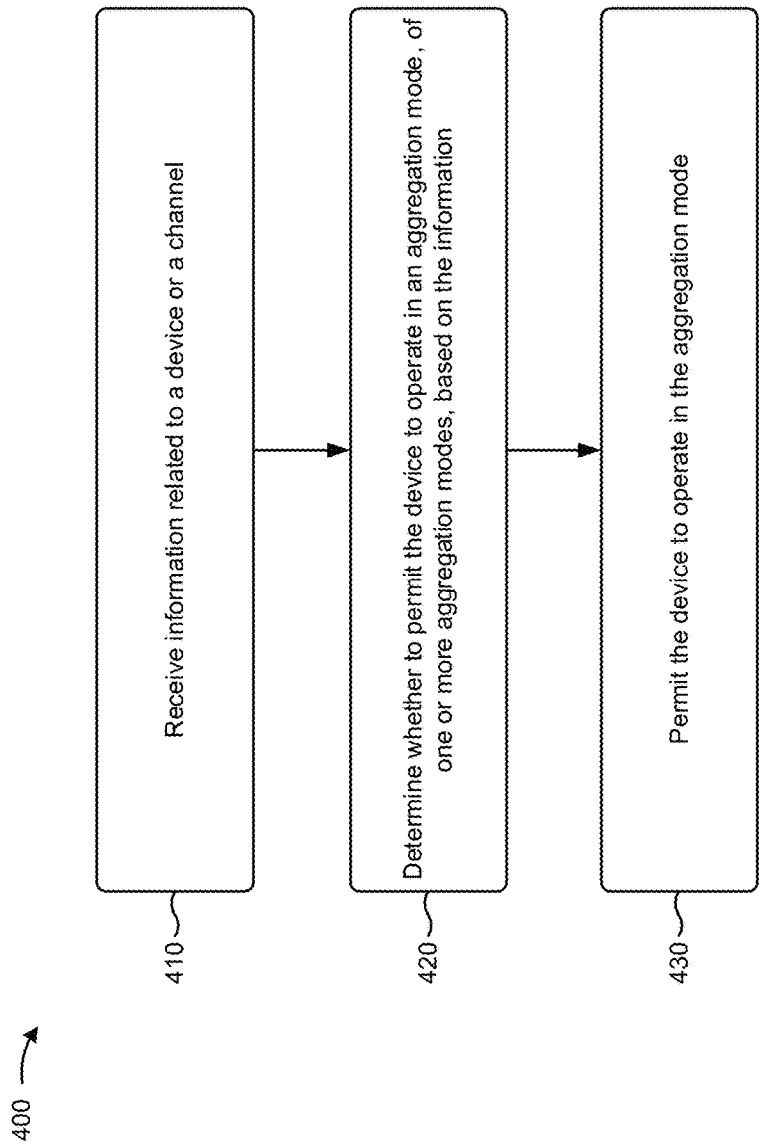
FIG. 4 is a flow chart of an example process for dynamically selecting an aggregation mode to use to communicate.

FIG. 4 is a flow chart of an example process 400 for dynamically selecting an aggregation mode to use to communicate. In some implementations, one or more process blocks of FIG. 4 may be performed by base station 220. In some implementations, one or more process blocks of FIG. 4 may be performed by another device or a group of devices separate from or including base station 220, such as user device 210, WLAN gateway device 230, MME 240, SGW 250, PGW 260, HSS 270, and/or AAA 280.

As shown in FIG. 4, process 400 may include receiving information related to a device or a channel (block 410). For example, base station 220 may receive information related to a bandwidth capability of a device, an aggregation mode capability of a device, and/or a quantity of channels available for user device 210 and/or another device to use to communicate.

In some implementations, base station 220 may receive the information based on requesting the information (e.g., from user device 210 and/or WLAN gateway device 230), based on performing a measurement (e.g., a received signal strength indicator (RSSI) measurement or determining a quantity of devices connected to base station 220 in real-time or near real-time), based on receiving the information in a message from another device (e.g., from user device 210 or WLAN gateway device 230), and/or based on using information configured on base station 220. Additionally, or alternatively, base station 220 may receive the information periodically (e.g., once per day, once per week, or the like) or according to a schedule.

In some implementations, a bandwidth capability may include an amount of bandwidth with which a device is configured to operate (e.g., 40 MHz of bandwidth or 80 MHz of bandwidth). In some implementations, a bandwidth capability may vary based on the type of device. For example, base station 220 may be configured to operate with 40 MHz of bandwidth and WLAN gateway device 230 may be configured to operate with 80 MHz of bandwidth.

In some implementations, a bandwidth capability may vary based on an aggregation mode associated with the device. For example, base station 220 associated with a first aggregation mode may be configured to use 20, 40, 60, or 80 MHz of bandwidth and WLAN gateway device 230 associated with a second aggregation mode may be configured to use 20, 40, 80, or 160 MHz of bandwidth although any bandwidth is appropriate.

In some implementations, an aggregation mode may include a mode of operation of a device that causes the device to use multiple frequency spectrums (e.g., radio frequency (RF) spectra, such as a 5 GHz spectrum or a 2.4 GHz spectrum) to communicate. For example, an aggregation mode may include an LAA aggregation mode (e.g., with a bandwidth capability of 20, 40, 60, or 80 MHz of a 5 GHz spectrum), an LWA aggregation mode (e.g., with a bandwidth capability of 20, 40, 80, or 160 MHz of a 5 GHz spectrum), and/or an enhanced LAA (eLAA) aggregation mode that supports bi-directional communications (e.g., based on 3GPP release 14). Continuing with the previous example, the LWA aggregation mode may include one or more aggregation modes, such as an upper layer aggregation mode, where, for example, aggregation occurs at layer 5 or above of the open systems interconnection (OSI) model, or a packet data convergence protocol (PDCP) aggregation mode, where aggregation occurs at the PDCP level. In some implementations, user device 210, base station 220, and/or another device may be configured to use one or more aggregation modes. For example, user device 210, base station 220, and/or another device may be configured to use an LAA aggregation mode and/or an LWA aggregation mode.

In some implementations, base station 220 may receive information related to whether a channel is available. For example, base station 220 may receive information related to a quantity of devices communicating via a channel, an RSSI value of the channel, an amount of traffic being sent via the channel, and/or the like. In some implementations, an available channel may include a channel that has a designated frequency that is available for communications. For example, an available channel may include a channel that has a threshold amount of traffic or a threshold RSSI value, is more available relative to other channels (e.g., based on having a lower RSSI value or a lower amount of traffic relative to the other channels), and/or the like.

In some implementations, base station 220 may determine whether a channel is available based on the information. For example, base station 220 may determine whether the channel has a threshold amount of traffic, a threshold signal strength (e.g., as indicated by an RSSI value), a threshold quantity of devices communicating via the channel, and/or the like.

Although an available channel may be identified using a threshold, an available channel may be identified based on a relative availability, or relative quality, of various channels. For example, an available channel may be identified using a score that is based on various measurement values related to the channel (e.g., an RSSI value, an SINR value, etc.), despite the channel being occupied by other traffic and/or the various measurement values not satisfying a threshold. In this case, traffic to/from base station 220 using an aggregation mode may have to share a channel with other traffic.

In this way, base station 220 may receive information related to a channel and quickly and efficiently determine whether the channel is available to use to communicate, thereby conserving processing resources.

As further shown in FIG. 4, process 400 may include determining whether to permit the device to operate in an aggregation mode, of one or more aggregation modes, based on the information (block 420). For example, base station 220 may determine whether to permit user device 210 to operate in an LAA aggregation mode and/or an LWA aggregation mode. In some implementations, base station 220 may determine whether to permit user device 210 to operate in an aggregation mode based on the received information.

In some implementations, base station 220 may determine an amount of available bandwidth for communications (e.g., based a quantity of available channels and the bandwidth of each channel). For example, base station 220 may determine a total amount of bandwidth available based on determining that a quantity of channels associated with a frequency spectrum is available (e.g., where each channel has an amount of bandwidth). Continuing with the previous example, assume that each channel associated with a frequency spectrum has 20 MHz of bandwidth. In this case, if base station 220 determines that two channels associated with the frequency spectrum are available, then base station 220 may determine that 40 MHz is the total amount of bandwidth available for communications.

In some implementations, base station 220 may determine a bandwidth capability of a device. For example, base station 220 may determine that user device 210, base station 220, and/or WLAN gateway device 230 can use a particular quantity of channels or a particular amount of bandwidth when operating in an aggregation mode. In some implementations, base station 220 may compare the amount of bandwidth available and the bandwidth capabilities of the device to determine whether to enable a particular aggregation mode or to permit the device to operate in the aggregation mode.

As a first example, assume that base station 220 determines that 80 MHz of bandwidth is available in a 5 GHz frequency spectrum. Further assume, for example, that a bandwidth capability of base station 220 permits base station 220 to use two channels of 5 GHz frequency spectrum (e.g., 40 MHz of bandwidth) in an LAA aggregation mode, despite 80 MHz of bandwidth being available. Further assume, for example, that a bandwidth capability of WLAN gateway device 230 permits WLAN gateway device 230 to use 80 MHz of bandwidth in an LWA aggregation mode. In this case, base station 220 may determine to permit use of an LWA aggregation mode (e.g., rather than an LAA aggregation mode) based on more bandwidth being available for use in an LWA aggregation mode relative to an LAA aggregation mode (e.g., 80 MHz of LWA bandwidth relative to 40 MHz of LAA bandwidth). In this way, base station 220 improves communications by permitting operation in an LWA aggregation mode when more bandwidth can be used by devices operating in an LWA aggregation mode relative to an LAA aggregation mode.

As a second example, assume that base station 220 determines that 60 MHz of bandwidth is available in a 5 GHz frequency spectrum. Further assume, for example, that a bandwidth capability of base station 220 permits base station 220 to use two channels of 5 GHz frequency spectrum (e.g., 40 MHz of bandwidth) in an LAA aggregation mode (e.g., despite 60 MHz of bandwidth being available). Further assume, for example, that a bandwidth capability of WLAN gateway device 230 permits WLAN gateway device 230 to use 40 MHz of bandwidth in an LWA aggregation mode. In this case, base station 220 may determine that the bandwidth capabilities associated with an LAA aggregation mode and an LWA aggregation mode are the same (e.g., based on the bandwidth capabilities for both the LAA aggregation mode and the LWA aggregation mode being 40 MHz).

In some implementations, when the bandwidth capabilities associated with an LAA aggregation mode and an LWA aggregation mode are the same, base station 220 may permit operation in a particular aggregation mode by default. For example, base station 220 may permit operation in an LAA aggregation mode by default and permit operation in an LWA aggregation mode when a quantity of LWA capable devices is greater than a quantity of LAA capable devices, is greater by a threshold quantity, satisfies a threshold, and/or the like. As another example, base station 220 may randomly permit operation in an LAA aggregation mode or an LWA aggregation mode (e.g., rather than permitting operation in the LAA aggregation mode by default). This conserves processing resources of base station 220 by permitting base station 220 to quickly and efficiently determine to permit operation in particular aggregation mode when the bandwidth capabilities for multiple aggregation modes are the same.

As a third example, assume that base station 220 determines that 60 MHz of bandwidth is available in a 5 GHz frequency spectrum. Further assume, for example, that a bandwidth capability of base station 220 permits base station 220 to use three channels of 5 GHz frequency spectrum (e.g., 60 MHz of bandwidth) in an LAA aggregation mode. Further assume, for example, that a bandwidth capability of WLAN gateway device 230 permits WLAN gateway device 230 to use 40 MHz of bandwidth in an LWA aggregation mode. In this case, base station 220 may determine to permit operation in an LAA aggregation mode (e.g., rather than in an LWA aggregation mode) based on the bandwidth capability for the LAA aggregation mode having more bandwidth relative to the bandwidth capability for the LWA aggregation mode (e.g., 60 MHz of LAA bandwidth relative to 40 MHz of LWA bandwidth). In this way, base station 220 may permit use of an LAA aggregation mode when more bandwidth can be used by devices operating in an LAA aggregation mode relative to an LWA aggregation mode, thereby improving communications and capacity.

In some implementations, base station 220 may determine whether to permit operation in a particular aggregation mode based on a quantity of devices that can operate in the aggregation mode. For example, base station 220 may determine to operate in a first aggregation mode when a first quantity of devices that can operate in the first aggregation mode exceeds a second quantity of devices that can operate in a second aggregation mode, exceeds the second quantity of devices by a threshold quantity, satisfies a threshold, and/or the like. In this way, base station 220 improves communications by permitting operation in an aggregation mode based on the quantity of devices that can operate in the aggregation mode.

In some implementations, when determining whether to enable a particular aggregation mode based on a quantity of devices that can operate in the aggregation mode, base station 220 may use an equation to determine a mode of operation. For example, base station 220 may use the equation:

$$UD_{LAA} - (UD_{LWA} + UD_{LWA+LAA}) > Th1 \quad (1)$$

In some implementations, base station 220 may use equation 1 when a bandwidth capability for a first aggregation mode (e.g., an LWA aggregation mode) includes more bandwidth than a bandwidth capability for a second aggregation mode (e.g., an LAA aggregation mode), such as in the first example described above, and/or when base station 220 initially determines to permit operation in the first aggregation mode. In equation 1, and using LAA and LWA aggregation modes as an example, the term $UD_{LAA}$ may represent a quantity of user devices 210 that can operate in an LAA aggregation mode and not in an LWA aggregation mode (referred to herein as LAA user devices 210), the term $UD_{LWA}$ may represent a quantity of user devices 210 that can operate in an LWA aggregation mode and not in an LAA aggregation mode (referred to herein as LWA user devices 210), the term $UD_{LWA+LAA}$ may represent a quantity of user devices 210 that can operate in both an LWA aggregation mode and an LAA aggregation mode (referred to herein as LWA/LAA user devices 210), and the term Th1 may represent a first threshold quantity of user devices 210.

In this case, base station 220 may use equation 1 to determine whether to permit operation in an LAA aggregation mode and/or whether to switch from permitting operation in an LWA aggregation mode to permitting operation in an LAA aggregation mode. For example, base station 220 may determine to permit operation in an LAA aggregation mode and/or to switch from permitting operation in an LWA aggregation mode to permitting operation in an LAA aggregation mode when the difference between a quantity of LAA user devices 210 and a quantity of LWA user devices 210 and LWA/LAA user devices 210 satisfies threshold Th1. In this way, base station 220 improves communications by permitting operation in an LAA aggregation mode when the quantity of LAA user devices 210 exceeds the quantity of LWA user devices 210 and LWA/LAA user devices 210.

In some implementations, when determining whether to permit operation in a particular aggregation mode based on a quantity of devices that can operate in the aggregation mode, base station 220 may use another equation to determine a mode of operation. For example, base station 220 may use the equation:

$$UD_{LWA} - (UD_{LAA} + UD_{LWA+LAA}) > Th2 \qquad (2)$$

In some implementations, base station 220 may use equation 2 when a bandwidth capability for an LWA aggregation mode includes the same amount of bandwidth as a bandwidth capability for an LAA aggregation mode, such as in the second example described above, and/or when base station 220 initially determines to permit operation in an LAA aggregation mode. In equation 2, the terms $UD_{LAA}$, $UD_{LWA}$, and $UD_{LWA+LAA}$ may represent the same quantities as in equation 1, and the term Th2 may represent a second threshold quantity of user devices 210.

In this case, base station 220 may use equation 2 to determine whether to permit operation in an LWA aggregation mode and/or whether to switch from permitting operation in an LAA aggregation mode to permitting operation in an LWA aggregation mode. For example, base station 220 may determine to permit operation in an LWA aggregation mode and/or to switch from permitting operation in an LAA aggregation mode to permitting operation in an LWA aggregation mode when the difference between a quantity of LWA user devices 210 and a quantity of LAA user devices 210 and LWA/LAA user devices 210 satisfies threshold Th2. In this way, base station 220 improves communications by permitting operation in an LWA aggregation mode when the quantity of LWA user devices 210 exceeds the quantity of LAA user devices 210 and LWA/LAA user devices 210.

In some implementations, when determining whether to enable a particular aggregation mode based on a quantity of devices that can operate in the LAA aggregation mode, base station 220 may use another equation to determine a mode of operation. For example, base station 220 may use the equation:

$$UD_{LWA} - (UD_{LAA} + UD_{LWA+LAA}) > Th3 \qquad (3)$$

In some implementations, base station 220 may use equation 3 when a bandwidth capability for an LAA aggregation mode includes more bandwidth than a bandwidth capability for an LWA aggregation mode, such as in the third example described above, and/or when base station 220 initially determines to permit operation an LAA aggregation mode. In equation 3, the terms $UD_{LAA}$, $UD_{LWA}$, and $UD_{LWA+LAA}$ may represent the same quantities as in equation 1 and equation 2, and the term Th3 may represent a third threshold quantity of user devices 210.

In this case, base station 220 may use equation 3 to determine whether to permit operation in an LWA aggregation mode and/or whether to switch from permitting operation in an LAA aggregation mode to permitting operation in an LWA aggregation mode. For example, base station 220 may determine to permit operation in an LWA aggregation mode and/or to switch from permitting operation in an LAA aggregation mode to permitting operation in an LWA aggregation mode when the difference between a quantity of LWA user devices 210 and a quantity of LAA user devices 210 and LWA/LAA user devices 210 satisfies threshold Th3. In this way, base station 220 improves communications by permitting operation in an LWA aggregation mode when the quantity of LWA user devices 210 exceeds the quantity of LAA user devices 210 and LWA/LAA user devices 210.

In some implementations, base station 220 may determine whether to permit operation in an aggregation mode based on a geographic location of user device 210 relative to base station 220 and/or WLAN gateway device 230. For example, base station 220 may determine whether to permit operation in an aggregation mode based on a geographic location in a non-collocated configuration where base station 220 and WLAN gateway device 230 are separate devices and when a licensed frequency spectrum (e.g., a radio band 2 of a 1900 MHz frequency spectrum, a radio band 4 of a 1700 MHz frequency spectrum, a radio band 13 of a 700 MHz frequency spectrum, or any other radio band of any other frequency spectrum) has a greater geographic coverage area relative to an unlicensed frequency spectrum (e.g., a 5 GHz frequency spectrum).

In some implementations, base station 220 may determine to permit operation in a first aggregation mode (e.g., an LAA aggregation mode) when user device 210 is located within a threshold distance from base station 220. As another example, base station 220 may determine to permit operation in a second aggregation mode (e.g., an LWA aggregation mode) when user device 210 is located within a threshold distance from WLAN gateway device 230 and/or base station 220, such as when user device 210 is located at, or near, an edge of a licensed carrier coverage area. This improves communications in a non-collocated configuration by enabling base station 220 to dynamically permit user device 210 to operate in an aggregation mode based on whether user device 210 is in range of base station 220 and/or WLAN gateway device 230.

In this way, base station 220 may dynamically determine to permit operation in an aggregation mode, thereby enabling base station 220 to modify selection of the aggregation mode based on network conditions. This improves communications between base station 220 and another device when network conditions would otherwise interfere with the communications.

As further shown in FIG. 4, process 400 may include permitting the device to operate in the aggregation mode (block 430). For example, base station 220 may permit user device 210, base station 220, and/or WLAN gateway device 230 to operate in an LAA aggregation mode and/or an LWA aggregation mode.

In some implementations, base station 220 may permit operation in an aggregation mode by providing information to a device and/or configuring a device. For example, base station 220 may provide information and/or instructions to user device 210 and/or WLAN gateway device 230 that indicate that user device 210 and/or WLAN gateway device 230 may operate in the aggregation mode. As another example, base station 220 may configure a setting of user device 210, base station 220, and/or WLAN gateway device 230 to permit user device 210, base station 220, and/or WLAN gateway device 230 to operate in the aggregation mode.

In this way, base station 220 may dynamically permit a device to operate in an aggregation mode based on information related to the device and/or a channel. This improves communications via dynamic use of multiple frequency spectra for communications. Additionally, in this way, base station 220 may quickly and efficiently determine a particular aggregation mode in which to permit a device to operate, thereby conserving processing resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
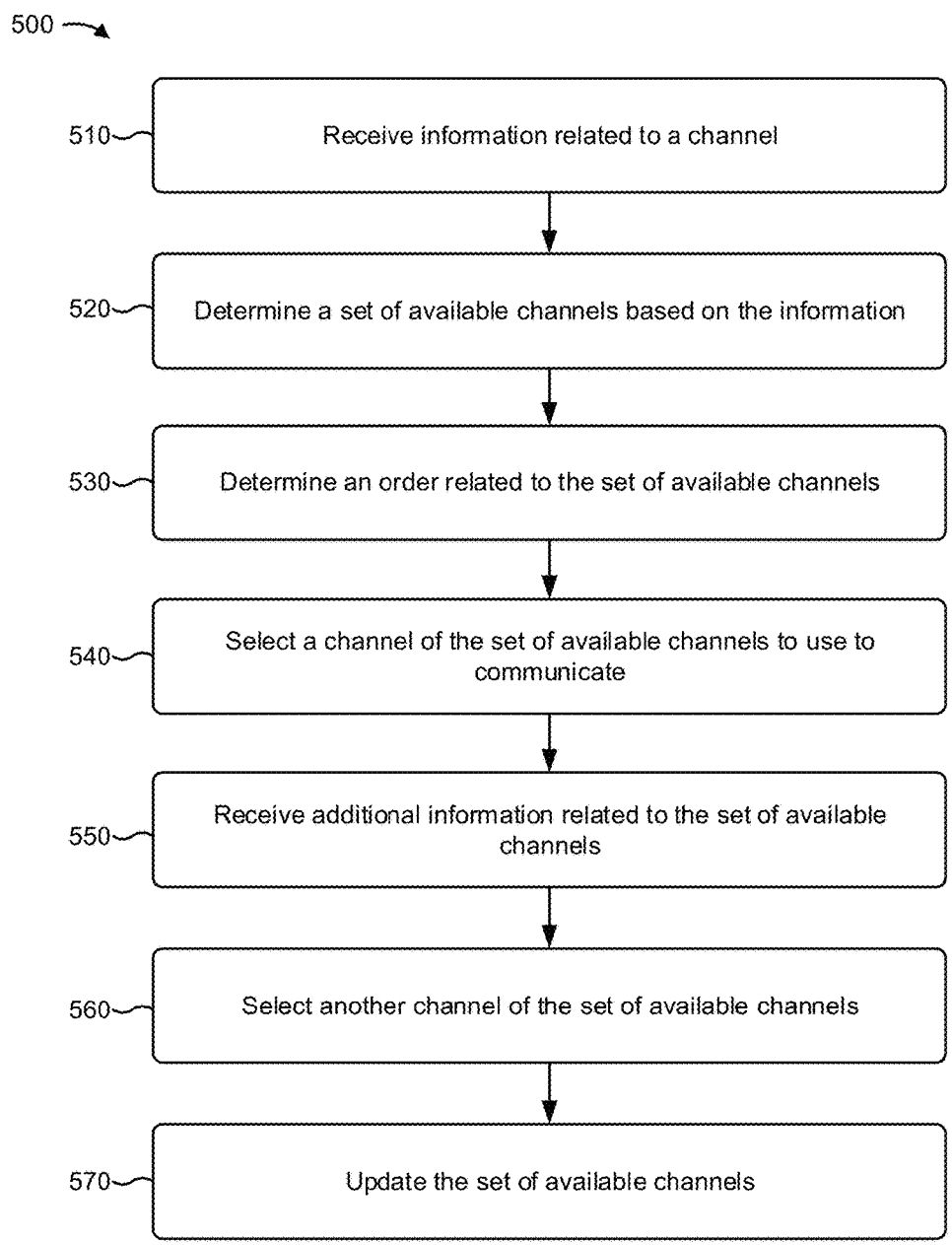
FIG. 5 is a flow chart of an example process for selecting a channel in a frequency spectrum to use to communicate.

FIG. 5 is a flow chart of an example process 500 for selecting a channel for communications in a frequency spectrum. In some implementations, one or more process blocks of FIG. 5 may be performed by base station 220. In some implementations, one or more process blocks of FIG. 5 may be performed by another device or a group of devices separate from or including base station 220, such as user device 210, WLAN gateway device 230, MME 240, SGW 250, PGW 260, HSS 270, and/or AAA 280. In some implementations, one or more process blocks of FIG. 5 may be performed before, after, or concurrently with one or more process blocks of FIG. 4.

As shown in FIG. 5, process 500 may include receiving information related to a channel (block 510). For example, base station 220 may receive an RSSI value, an SINR value, and/or a value related to another measurement associated with one or more channels of a frequency spectrum (e.g., in a manner similar to that described above).

In some implementations, a frequency spectrum may include one or more radio bands. For example, a frequency spectrum may include an unlicensed national information infrastructure (U-NII) radio band, such as a U-NII-1 radio band or a U-NII-3 radio band. In this way, base station 220 may receive information related to a channel of a frequency spectrum.

As further shown in FIG. 5, process 500 may include determining a set of available channels based on the information (block 520). For example, base station 220 may determine the set of available channels based on the RSSI value, the SINR value, another measurement value, and/or a combination of the RSSI value, the SINR value, and/or the other measurement value.

In some implementations, base station 220 may determine the set of available channels using a threshold. For example, base station 220 may determine the set of available channels by determining whether a measurement associated with the channel satisfies a threshold based on an RSSI value, an SINR value, and/or another measurement value related to the channel (e.g., a predetermined threshold or a threshold configured by a network operator). In some implementations, base station 220 may determine that a channel is available when an associated measurement satisfies a threshold. Conversely, in some implementations, base station 220 may determine that a channel is unavailable when an associated measurement does not satisfy a threshold or satisfies a threshold different from the threshold used to determine that a channel is available.

In some implementations, base station 220 may adjust the threshold. For example, base station 220 may increase or decrease a value of the threshold. In some implementations, base station 220 may increase a value of the threshold to control or reduce the quantity of channels that are determined to be available. In this way, base station 220 improves communications by causing base station 220 to identify channels that are more available (e.g., relative to other channels) as the set of available channels. Conversely, in some implementations, base station 220 may decrease a value of the threshold to control or increase the quantity of channels that are determined to be available. In this way, base station 220 improves channel selection by causing base station 220 to identify a higher quantity of channels as the set of available channels (e.g., relative to using a higher threshold). Additionally, this conserves processing resources by reducing or eliminating the need for base station 220 to re-determine the set of available channels by including a higher quantity of channels in the set of available channels (e.g., relative to using a higher threshold).

In some implementations, the set of available channels may include channels that are statically or dynamically used by various devices. In some implementations, the set of available channels may include channels that are used statically by WLAN gateway device 230 (e.g., an enterprise WLAN gateway device 230 or a residential WLAN gateway device 230). Additionally, or alternatively, the set of available channels may include channels that are used dynamically by user device 210, such as when user device 210 is functioning as a Wi-Fi hotspot. In this way, base station 220 improves channel selection by increasing a quantity of channels that are included in the set of available channels based on including both statically and dynamically used channels in set of available channels. In addition, this conserves processing resources by reducing or eliminating a need for base station 220 to re-determine the set of available channels by including a higher quantity of channels in the set of available channels relative to a set of available channels that includes statically or dynamically used channels but not both.

In some implementations, base station 220 may store information identifying the set of available channels. In some implementations, base station 220 may store information identifying the set of available channels in a data structure using memory resources of base station 220. In this way, base station 220 conserves processing resources by preventing base station 220 from having to re-determine the set of available channels each time. Additionally, or alternatively, base station 220 may store the information identifying the set of available channels in a data structure using memory resources of another device (e.g., a centralized device accessible by multiple base stations 220). This conserves memory resources of base station 220 by reducing or eliminating the need for base station 220 to store the set of available channels.

In this way, base station 220 may determine a set of available channels from which to select a channel to use to communicate.

As further shown in FIG. 5, process 500 may include determining an order related to the set of available channels (block 530). For example, base station 220 may determine an order related to the set of available channels using the received information.

In some implementations, base station 220 may determine a score, a rank, or a priority (e.g., high, medium, low) for each of the channels included in the set of available channels. For example, base station 220 may determine a first score for a first channel included in the set of available channels and a second score for a second channel included in the set of available channels. In some implementations, base station 220 may determine an order, for selection, of the set of available channels based on the score, the rank, or the priority (e.g., based on highest to lowest or lowest to highest). For example, base station 220 may determine that a first channel is to be ordered, for selection, before a second channel based on the first channel having a higher score, rank, or priority relative to the second channel. Continuing with the previous example, when base station 220 selects a channel for communications, base station 220 would select the first channel before selecting the second channel.

In some implementations, base station 220 may store information identifying the order of the set of available channels. Because base station 220 stores the information, it does not have to utilize processing resources to recalculate the order and therefore permits base station 220 to quickly and efficiently identify available channels and the order in which to select a channel from the set of available channels. In addition, in some implementations, base station 220 may provide the set of available channels to another base station 220. This also conserves resources, especially processing resources of the other base station 220 by reducing or eliminating a need for the other base station 220 to determine the set of available channels.

In some implementations, base station 220 may determine an order for the set of available channels based on the received information (e.g., the information used to determine whether a particular channel is available). For example, base station 220 may order a first channel before a second channel based on the first channel having a lower RSSI value relative to the second channel (e.g., indicating a lower possibility of interference with other devices using the same channel relative to the second channel), having less traffic relative to the second channel, being used by a smaller quantity of devices relative to the second channel, and/or the like. This improves communications by causing base station 220 to select channels with less traffic/load relative to other channels, thereby reducing or eliminating communication errors that would occur from congestion and/or interference.

In some implementations, base station 220 may determine an order of two or more channels that have the same measured values and/or the same amount of traffic/load. For example, base station 220 may determine an order of two or more channels that have the same RSSI value. In this case, base station 220 may determine an order of the two channels in a different manner than what was described above. In some implementations, when two or more channels have the same measured value and/or the same amount of traffic/load, base station 220 may determine an order of the channels by randomly assigning an order to the channels. Additionally, or alternatively, base station 220 may determine an order of the channels by ordering a channel associated with a particular radio band (e.g., a U-NII-3 radio band) before a channel associated with another radio band (e.g., a U-NII-1 radio band). Additionally, or alternatively, base station 220 may order channels of the set of available channels based on an identifier of each channel. For example, base station 220 may order the channels from highest to lowest channel identifier, lowest to highest channel identifier, alphabetical order, or reverse alphabetical order.

Additionally, or alternatively, base station 220 may order the channels based on whether the channels are adjacent (e.g., in terms of frequency) to channels that have traffic, a threshold amount of traffic, measured values that satisfy a threshold, and/or the like. For example, assume that channel 36 in a U-NII-1 radio band has traffic, or has a threshold amount of traffic, and that channels 32, 40, and 44 of the same radio band do not have traffic, have the same amount of traffic, or have an amount of traffic that satisfies a different threshold. In this case, base station 220 may prioritize channel 44 over channels 32 and 40 based on channels 32 and 40 being adjacent to channel 36, which has traffic or a threshold amount of traffic, and channel 44 not being adjacent to a channel that has traffic or a threshold amount of traffic (e.g., channel 36 in this example).

In this way, base station 220 may determine an order for selecting a channel of the set of available channels, thereby conserving processing resources by permitting base station 220 to quickly and efficiently determine a channel to select.

As further shown in FIG. 5, process 500 may include selecting a channel, included in the set of available channels, to use to communicate (block 540). For example, base station 220 may select a channel that is associated with a radio band of a frequency spectrum.

In some implementations, base station 220 may select the channel based on the order of the channels included in the set of available channels. For example, base station 220 may select a first channel ordered first before selecting a second channel ordered after the first channel. In some implementations, when base station 220 selects a channel, base station 220 may determine whether there is an active or on-going communication via the channel. For example, base station 220 may determine whether there is an active or on-going communication via the channel prior to communicating, or permitting communications, via the channel. In some implementations, base station 220 may use a 3GPP listen-before-talk mechanism to determine whether there is an active or on-going communication via the channel. Additionally, or alternatively, base station 220 may perform a clear channel assessment prior to communicating, or permitting communications, via a channel. This improves communications by reducing or eliminating errors that would occur from congestion and/or interference.

In this way, base station 220 may quickly and efficiently select a channel to use to communicate, thereby conserving processing resources.

As further shown in FIG. 5, process 500 may include receiving additional information related to the set of available channels (block 550). For example, base station 220 may receive additional information related to the set of available channels in a manner similar to that described above. In some implementations, base station 220 may receive updated measured values for the channels. Additionally, or alternatively, base station 220 may receive an indication that another device is communicating via the channel (e.g., by using a listen-before-talk mechanism or performing a clear channel assessment). In some implementations, when receiving the additional information, base station 220 may receive information related to a channel included in the set of available channels. Additionally, or alternatively, when receiving the additional information, base station 220 may receive information related to a channel not included in the set of available channels.

In some implementations, when base station 220 receives the additional information, base station 220 may determine whether a channel is available for communications in a manner similar to that described above. Additionally, or alternatively, base station 220 may determine whether a channel is available using a clear channel assessment. For example, base station 220 may use the clear channel assessment to determine whether a channel is available during a particular time slot of the channel. In some implementations, when base station 220 determines that a channel is unavailable using a clear channel assessment, base station 220 may perform another clear channel assessment for the next time slot of the channel to determine whether the channel is available during the next time slot.

In some implementations, if base station 220 determines that the channel is available during the next time slot, then base station 220 may communicate, or permit communications, via the channel during the next time slot. Conversely, in some implementations, if base station 220 determines that the channel is not available during the next time slot, then base station 220 may perform a clear channel assessment for the time slot after the next time slot. In some implementations, base station 220 may continue to perform clear channel assessments for time slots of a channel until base station 220 determines that the channel is available.

In some implementations, when base station 220 is determining whether a channel is available for communications, base station 220 may use a counter value (e.g., to record a quantity of times base station 220 has determined whether the channel is available). For example, base station 220 may use a counter value to record a quantity of times that base station 220 has determined whether the channel is available using a clear channel assessment. Additionally, or alternatively, base station 220 may use a timer value to record an amount of time that base station 220 has been using, or attempting to use, a particular channel.

In some implementations, when a counter value satisfies a threshold during a particular amount of time, base station 220 may determine to select another channel (e.g., the next ordered channel of the set of available channels). In some implementations, the threshold may be configured by a network operator and may be dynamically configurable, such that the network operator may adjust how quickly base station 220 determines to select another channel. This conserves processing resources by preventing base station 220 from attempting to use a channel for communications after a threshold quantity of attempts is satisfied.

In this way, base station 220 may receive additional information related to a set of available channels.

As further shown in FIG. 5, process 500 may include selecting another channel of the set of available channels (block 560). For example, base station 220 may select the next ordered channel of the set of available channels using the order related to the set of available channels. In some implementations, base station 220 may select the other channel when base station 220 has attempted to use the initially selected channel a threshold quantity of times.

In some implementations, when base station 220 selects the other channel, base station 220 may determine whether there is an active or on-going communication via the channel in a manner similar to that described above. For example, base station 220 may use a listen-before-talk mechanism and/or a clear channel assessment mechanism in a manner similar to that described above (e.g., prior to communicating, or permitting communications, via the channel). In other words, block 560 may include returning to block 550. In some implementations, base station 220 may continue to select other channels in a manner similar to that described with respect to blocks 550 and 560. In some implementations, base station 220 may continue to select other channels until the last channel included in the set of available channels is selected or until base station 220 has selected each channel a threshold quantity of times.

In this way, base station 220 may select another channel from the set of available channels, such as when conditions related to a channel have changed. This improves communications by preventing base station 220 from communicating, or permitting communications, via a channel where conditions of the channel may cause errors due to congestion and/or interference.

As further shown in FIG. 5, process 500 may include updating the set of available channels (block 570). For example, base station 220 may update the set of available channels when base station 220 has selected each channel of the set of available channels or has selected each channel a threshold quantity of times.

In some implementations, base station 220 may re-determine an order for the set of available channels, re-determine the set of available channels, and/or the like in a manner similar to that described above. In other words, block 570 may include returning to block 510 and/or block 520.

In some implementations, base station 220 may determine whether to add or remove a particular channel from the set of available channels. In some implementations, base station 220 may re-measure values (e.g., an RSSI value or an SINR value) associated with a channel and may add the channel to the set of available channels when base station 220 determines that the measured value satisfies a threshold (e.g., indicating that the channel is available). Additionally, or alternatively, base station 220 may re-measure values associated with a channel and may remove the channel from the set of available channels when base station 220 determines that the measured value satisfies a threshold (e.g., indicating that the channel is not available). In some implementations, when removing a channel, if the quantity of channels included in the set of available channels satisfies a threshold, base station 220 may re-determine the set of available channels. For example, base station 220 may re-determine the set of available channels in a manner similar to how base station 220 determined the initial set of available channels.

In some implementations, base station 220 may select multiple channels from the set of available channels (e.g., rather than a single channel). For example, base station 220 may select multiple channels to support a multi-channel LAA aggregation mode.

In some implementations, base station 220 may use information related to traffic variations when determining an order related to the set of available channels (e.g., daily traffic variations in an unlicensed frequency spectrum based on activation and deactivation of Wi-Fi hotspots). For example, base station 220 may determine that a first channel is order before a second channel at a first time of day and that the second channel is ordered before the first channel at a second time of day based on daily traffic variations of the first channel and the second channel.

In some implementations, when base station 220 has selected a channel to use to communicate, base station 220 may monitor (e.g., in real-time or near real-time) total channel occupancy time for the channel and/or another channel. In some implementations, base station 220 may use the total channel occupancy time to determine an order of the channel and/or the other channel, determine when to select the other channel (e.g., based on the total occupancy time for the channel satisfying a threshold), and/or the like. This improves channel selection via use of real-time or near real-time total channel occupancy time. In this way, base station 220 may order channels for selection based on the RSSI value, the SINR value, traffic, or the like, in addition to a set of real-time or near real-time channel utilization profiles.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
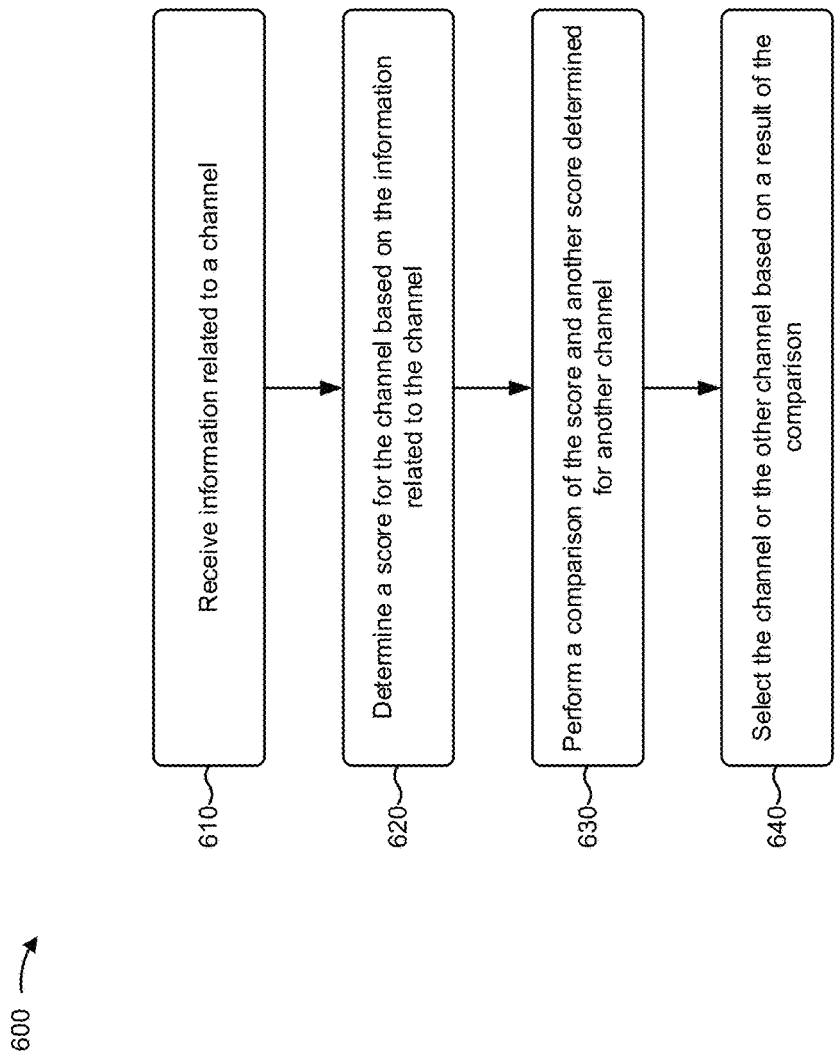
FIG. 6 is a flow chart of another example process for selecting a channel in a frequency spectrum to use to communicate.

FIG. 6 is a flow chart of an example process 600 for selecting a channel in a frequency spectrum to use to communicate. In some implementations, one or more process blocks of FIG. 6 may be performed by base station 220. In some implementations, one or more process blocks of FIG. 6 may be performed by another device or a group of devices separate from or including base station 220, such as user device 210, WLAN gateway device 230, MME 240, SGW 250, PGW 260, HSS 270, and/or AAA 280. In some implementations, one or more process blocks of FIG. 6 may be performed before, after, or concurrently with one or more process blocks of FIG. 4 and/or FIG. 5.

As shown in FIG. 6, process 600 may include receiving information related to a channel (block 610). For example, base station 220 may receive information related to a 20 MHz channel of a 5 GHz frequency spectrum, such as an RSSI value, an amount of traffic, and/or an amount of power associated with the channel (e.g., an amount of radiated power that is permitted to be used when communicating via the channel, expressed as decibel-milliwatts (dBms)), and/or other information related to the channel. In some implementations, base station 220 may receive the information in a manner similar to that described above. In some implementations, the information may relate to a channel of a radio band. For example, the information may relate to a channel of a U-NII-1 radio band or U-NII-3 radio band of a 5 GHz frequency spectrum.

In some implementations, base station 220 may include an antenna. In some implementations, base station 220 may include an antenna that has various radiation patterns at various elevation angles (e.g., an omnidirectional antenna). Additionally, or alternatively, base station 220 may include an antenna that has a radiation pattern in a particular direction and at an elevation angle (e.g., a directional antenna). As described above, in some cases, the radiated power of an antenna of base station 220 may have to satisfy a threshold amount of radiated power (e.g., as specified by a government or private entity, by design specifications, etc.), such as to prevent the radiated power from causing interference with other devices.

In some implementations, base station 220 may select an amount of power to use when communicating using the antenna (e.g., using software or an application installed on base station 220, executing on base station 220, or executing remotely from base station 220). In some implementations, base station 220 may select an amount of power such that the amount of power (e.g., expressed as decibel-milliwatts (dBms)) radiated in a particular direction and/or gain (e.g., expressed as decibel-isotropic (dBi)) of the antenna satisfies a threshold. For example, the antenna may radiate power such that the amount of radiated power plus the amount of gain plus the loss of the antenna satisfies a threshold for a threshold elevation angle. Continuing with the previous example, the antenna may radiate power such that the amount of power radiated is less than or equal to 21 dBm for elevation angles greater than 30 degrees.

In some implementations, base station 220 may select an amount of power based on a channel and/or a radio band that base station 220 is using to communicate. For example, base station 220 may select a first amount of power for communications via a channel of a U-NII-1 radio band and a second amount of power for communications via a channel of a U-NII-3 radio band. In some implementations, when selecting an amount of power based on a channel and/or a radio band, base station 220 may select an amount of power such that the amount of radiated power satisfies a threshold for an amount of radiated power and/or an elevation angle (e.g., as described above). Additionally, or alternatively, base station 220 may select an amount of power for channels associated with different radio bands such that the difference between a first amount of power radiated when communicating via a first radio band and a second amount of power radiated when communicating via a second radio band satisfies a threshold (e.g., three or four decibels (dBs)).

In this way, base station 220 may dynamically select an amount of power to use when communicating via a channel. This improves communications by enabling base station 220 to select different amounts of power that satisfy different thresholds for different channels. In addition, this improves communications relative to another base station 220 that selects the same amount of power (e.g., a reduced amount of power from normal operation) for all channels, regardless of radio band, to satisfy a threshold associated with a particular channel and/or radio band.

As further shown in FIG. 6, process 600 may include determining a score for the channel based on the information related to the channel (block 620). For example, base station 220 may determine a score for the channel based on the information related to the RSSI value of the channel, the amount of traffic via the channel, and/or the amount of power associated with the channel (e.g., an amount of radiated power permitted to be used when communicating via the channel).

In some implementations, base station 220 may determine a score for each channel associated with a radio band (e.g., a U-NII-1 radio band and/or a U-NII-3 radio band). For example, base station 220 may determine a first score for a first channel of a radio band and a second score for a second channel of the radio band.

In some implementations, base station 220 may determine the score using information related to each channel of the radio band. For example, base station 220 may determine the score using information related to an RSSI value for each channel, an amount of traffic on each channel, an amount of radiated power permitted when communicating via each channel, and/or the like. In some implementations, determination of the score may be represented by an equation or a formula. For example, determination of the score may be represented by the equation:

$$Sx(i)=fcn(RSSI/\text{channel } i, \text{traffic/channel } i, Pwrx) \quad (4)$$

In equation 4, the term $Sx(i)$ may represent a score for channel i, the term $fcn( )$ may represent that the score $Sx(i)$ is a function of various information, the term RSSI/channel i may represent an RSSI value for channel i, the term traffic/channel i may represent an amount of traffic associated with channel i, and the term Pwrx may represent an amount of radiated power permitted when communicating via channel i or radio band x. In some implementations, determination of the score for another channel (e.g., channel j) may be represented by a similar equation that includes j rather than i. Additionally, or alternatively, determination of the score for a channel associated with another radio band (e.g., radio band y) may be represented by a similar equation that includes y rather than x.

In some implementations, base station 220 may determine the score based on the information satisfying a threshold. For example, base station 220 may determine a first score when an RSSI value, an amount of traffic, and/or the amount of radiated power permitted for a channel satisfies a first threshold and a second score when an RSSI value, an amount of traffic, and/or an amount of radiated power permitted satisfies a second threshold.

In some implementations, when determining the score, base station 220 may weight (or penalize) a channel more than another channel. In some implementations, base station 220 may weight a score for a channel associated with a particular radio band more than another score for another channel associated with another radio band. For example, base station 220 may weight a score for a channel associated with a U-NII-3 radio band more than a score for a channel associated with a U-NII-1 radio band so as to cause the channel associated with the U-NII-3 radio band to tend to receive a higher score relative the channel associated with the U-NII-1 radio band. Conversely, for example, base station 220 may penalize, or apply another weight, or apply a negative weight, to a score for a channel associated with a U-NII-1 radio band (e.g., rather than weighting channels associated with a U-NII-3 radio band) so as to cause the channel associated with the U-NII-1 radio band to receive lower scores relative to the channel associated with the U-NII-3 radio band. This improves channel selection by causing base station 220 to tend to select a channel associated with a particular radio band, such as when communicating via a channel associated with the particular radio band is preferred.

As another example, base station 220 may weight a channel based on a proximity of the frequency of the channel and an upper or lower limit of a frequency range, or radio band, with which the channel is associated. For example, assume that a U-NII-1 radio band has a lower limit of 5150 MHz and that a first channel associated with the U-NII-1 radio band has a frequency of 5150 MHz. In this case, base station 220 may weight a second channel of the U-NII-1 radio band (e.g., a channel with a frequency of 5170 MHz) more than the first channel based on the frequency of the first channel being at or near the lower limit of the U-NII-1 radio band. In this way, base station 220 reduces or eliminates transmissions outside of a radio band, thereby improving communications.

In some implementations, base station 220 may weight a channel more than another channel based on an amount of radiated power that is permitted for the channel. For example, base station 220 may weight a first channel (e.g., a U-NII-3 radio band channel) higher than a second channel (e.g., a U-NII-1 radio band channel) where a higher threshold amount of radiated power is permitted when communicating via the first channel relative to the second channel. This improves communications by causing base station 220 to tend to select a channel based on the channel being associated with a higher permitted amount of radiated power.

In some implementations, base station 220 may determine a score for a single channel associated with a radio band or for multiple channels associated with a radio band. For example, base station 220 may determine a score based on the information for a single channel or based on the information for multiple channels. Determining a score based on the information for multiple channels conserves processing resources by reducing a quantity of scores that base station 220 has to determine a set of channels relative to determining a score for each channel of the set of channels.

In some implementations, base station 220 may store information identifying a score. For example, base station 220 may store information identifying a score and information identifying the channel with which the score is associated using a data structure. This conserves processing resources by enabling base station 220 to quickly and efficiently identify a score and by reducing or eliminating the need for base station 220 to re-determine the score. In addition, base station 220 may provide the score to another base station 220, thereby conserving processing resources of the other base station 220 by reducing or eliminating the need for the other base station 220 to determine the score. Further, when base station 220 stores a score that is based on information related to multiple channels of a set of channels, base station 220 conserves memory resources relative to storing a score for each channel of the set of channels.

In this way, base station 220 may determine a score for a channel based on information related to the channel, thereby facilitating selection of a channel to use to communicate.

As further shown in FIG. 6, process 600 may include performing a comparison of the score and another score determined for another channel (block 630) and selecting the channel or the other channel based on a result of the comparison (block 640). For example, base station 220 may perform a comparison of a first score for a first channel of a first radio band and a second score for a second channel of the first radio band or a second radio band and may select the first channel or the second channel for communications based on whether the first score is higher relative to the second score, whether the first score or the second score satisfies a threshold, and/or the like. In some implementations, base station 220 may perform the comparison to determine whether, or which, channel to select to use to communicate.

In some implementations, when base station 220 performs a comparison of scores, the comparison may be represented by an equation. For example, the comparison may be represented by the equation:

$$Chl = \text{Min/Max}\{Sx(i), i=1 \text{ to } N, Sy(j), j=1 \text{ to } M\} \quad (5)$$

In equation 5, the term Chl may represent the channel base station 220 determines to select, the term Min/Max{ } may represent that base station 220 selects the minimum score or the maximum score, depending on how scores are determined, the term Sx(i) may represent the score for channel i associated with radio band x, the term i=1 to N may represent that there can be 1 to N channels, the term Sy(j) may represent the score for channel j associated with radio band y, and the term j=1 to M may represent that there can be 1 to M channels.

In some implementations, base station 220 may determine an order, a rank, or a priority (e.g., high, medium, low) for a channel based on the score associated with the channel. In some implementations, base station 220 may determine the order, the rank, or the priority based on a value of the score satisfying a threshold. For example, base station 220 may determine a higher priority for a first channel relative to a second channel based on a score associated with the first channel satisfying a threshold and a score associated with the second channel satisfying a different threshold.

Additionally, or alternatively, base station 220 may determine the order, the rank, or the priority based on a value of a score for a channel relative to a value of a score for another channel. For example, base station 220 may determine a higher priority for a first channel relative to a second channel based on a score for the first channel being higher than a score for a second channel or lower than a score for a second channel. Additionally, or alternatively, base station 220 may determine the order, the rank, or the priority based on the channel being associated with a particular radio band. For example, base station 220 may determine a higher priority for a first channel relative to a second channel based on the first channel being associated with a first radio band and the second channel being associated with a second radio band.

In some implementations, base station 220 may select a channel. In some implementations, base station 220 may select a channel based on a result of the comparison. For example, base station 220 may select the channel based on a result of a comparison of a first score and a second score, based on a result of a comparison of a first score and a threshold (e.g., to determine whether the score satisfies the threshold), and/or the like. Additionally, or alternatively, base station 220 may select the channel based on the order, the rank, or the priority. For example, base station 220 may select the channel ordered first relative to other channels, the channel that has the highest rank or priority relative to other channels, the channel that has an order, a rank, or a priority that satisfies a threshold, and/or the like.

In some implementations, when selecting a channel, base station 220 may identify multiple channels to select (e.g., based on the multiple channels having the same score or satisfying the same threshold). In this case, base station 220 may select one of the multiple channels to use to communicate. In some implementations, base station 220 may select a channel randomly when base station 220 identifies multiple channels to select. Additionally, or alternatively, when base station 220 identifies multiple channels associated with different radio bands, base station 220 may select a channel associated with a particular radio band (e.g., a U-NII-3 radio band) over a channel associated with another radio band (e.g., a U-NII-1 radio band), such as when a higher amount of radiated power is permitted when communicating via the particular radio band relative to the other radio band.

In some implementations, when base station 220 determines a score that is based on information associated with multiple channels, as described above, base station 220 may select multiple channels for communications. For example, when base station 220 determines a score that is based on RSSI values, amounts or traffic via multiple channels, and/or power related to multiple channels, base station 220 may select multiple channels (e.g., multiple contiguous channels) to use to communicate. This conserves processing resources by permitting base station 220 to perform fewer selections of channels relative to selecting a single channel. In addition, this reduces an amount of time between when base station 220 determines to communicate via a different channel by reducing or eliminating the need for base station 220 to determine another channel to select, thereby increasing an efficiency of communicating via multiple channels.

In some implementations, equations 4 and 5 may be modified to include information for multiple channels. In some implementations, equation 4 may be modified to represent determination of a score based on information related to multiple channels, as shown below:

$$Sx(i,j,k)=fcn\{\text{RSSI/channel } i, \text{RSSI/channel } j, \text{RSSI/channel } k, \text{traffic/channel } i, \text{traffic/channel } j, \text{traffic/channel } k, Pwrx\} \quad (6)$$

In equation 6, the terms may have the same meaning as described in equation 4, and in addition, the term j may represent channel j, and the term k may represent channel k. In some implementations, equation 5 may be modified to represent a comparison of scores based on information related to multiple channels, such as for selection of multiple channels, as shown below:

$$Chl=\text{Min}/\text{Max}\{Sx(i,j,k),Sy(l,m,n)\} \quad (7)$$

In equation 7, the terms may have the same meaning as described in equations 5 and 6, and in addition, the term l may represent channel l, the term m may represent channel m, and the term n may represent channel n.

In some implementations, base station 220 may detect previously undetected traffic on a channel. For example, base station 220 may detect traffic associated with activation of a WLAN gateway device 230 (e.g., via periodic RSSI measurements). In this case, if the previously undetected traffic is detected on a channel that base station 220 is using to communicate, then base station 220 may re-determine a score for the channel. In other words, block 640 may include returning to block 610 and/or block 620. Conversely, if the previously undetected traffic is detected on a channel that base station 220 is not using for communications, then base station 220 may continue to use the selected channel to communicate.

In some implementations, base station 220 may communicate and/or permit communications via the selected channel based on selecting the channel. In some implementations, base station 220 may send and/or receive communications via the selected channel. Additionally, or alternatively, base station 220 may send a message to another device (e.g., user device 210 or WLAN gateway device 230) that includes information identifying which channel the other device may use to communicate. In some implementations, when base station 220 selects a channel, user device 210, base station 220, and/or WLAN gateway device 230 may communicate using an aggregation mode. For example, user device 210, base station 220, and/or WLAN gateway device 230 may communicate using an LAA aggregation mode or an LWA aggregation mode.

In this way, base station 220 may select a channel for communications based on information related to the channel, thereby improving communications.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein permit a base station to dynamically select an aggregation mode (e.g., an LAA aggregation mode or an LWA aggregation mode) based on information related to a device and/or a channel. In addition, the base station may select a channel to use to communicate based on information related to the channel, including information related to an amount of radiated power permitted when communicating via the channel. In this way, the base station increases a traffic capacity and/or a coverage area of a network. In addition, this reduces channel selection time, thereby increasing channel scanning efficiency and reducing latency, delay, and/or packet loss. Further, this improves data throughput of a network and/or spectral efficiency of a channel by offloading traffic from a one frequency spectrum to another. Further still, this improves communications by dynamically prioritizing a selection of channels to use when communicating.

Although some implementations described herein relate to a 5 GHz frequency spectrum, the implementations may relate to a 2.4 GHz frequency spectrum, an Institute of Electrical and Electronics Engineers (IEEE) 802.11 specification frequency spectrum, or any other frequency spectrum. In addition, although some implementations described herein relate to use of an unlicensed frequency spectrum (e.g., via use of an LAA aggregation mode and/or an LWA aggregation mode), the implementations may relate to use of a licensed frequency spectrum or a combination of licensed and unlicensed spectra. Further, although some implementations described herein relate to directional communications (e.g., via use of an LAA aggregation mode and/or an LWA aggregation mode, which may relate to downlink communications and not uplink communications), the implementations may relate to multi-directional communications that include, for example, both uplink and downlink communications.

Further still, implementations described herein may relate to a collocated configuration, where, for example, a base station and a WLAN gateway device are integrated into the same device and may be connected via an internal interface of the device, or a non-collocated configuration, where, for example, a base station and a WLAN gateway device are not integrated into the same device and may be connected via a WLAN termination using a standard interface. Further still, although some implementations described herein relate to use of a single channel, the implementations may relate to use of multiple channels (e.g., simultaneously, separately, etc.). Further still, although some implementations described herein relate to 3GPP release 13, the implementations may relate to 3GPP release 14 or any other specification or standard.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive information related to multiple channels,
         the information indicating whether the multiple channels are available,
         the multiple channels being associated with multiple radio bands;
      determine an aggregation mode to use to communicate via the multiple channels;
      determine a set of available channels based on determining whether the multiple channels are available using the information,
         the set of available channels including one or more channels of the multiple channels,
         the set of available channels being determined based upon the set of available channels meeting a threshold;
      determine a first score of a first channel of the one or more channels of the multiple channels,
         the first score being determined based upon at least one of:
            information related to a received signal strength indicator (RSSI) value of the first channel,
            information related to an amount of traffic of the first channel, or
            information related to an amount of power associated with the first channel;
      determine a second score of a second channel of the one or more channels of the multiple channels,
         the second score being determined based upon at least one of:
            information related to an RSSI value of the second channel,
            information related to an amount of traffic of the second channel, or
            information related to an amount of power associated with the second channel;
      determine a first weighted score for the first channel based upon weighting the first score in association with a first particular radio band associated with the first channel;
      determine a second weighted score for the second channel based upon weighting the second score in association with a second particular radio band associated with the second channel,
         the first score for the first channel associated with the first particular radio band being weighted more than the second score for the second channel associated with the second particular radio band;

determine an order related to the first channel and the second channel,
the order being based on comparing the first weighted score of the first channel to the second weighted score of the second channel,
the comparison indicating that the first weighted score is more than the second weighted score;

select the first channel of the one or more channels based on the first weighted score being more than the second weighted score; and exchange communications via the first channel based on selecting the first channel.

2. The device of claim 1, where the one or more processors are further to:
receive additional information related to the one or more channels; and
select the second channel of the one or more channels based on receiving the additional information.

3. The device of claim 1, where the one or more processors, when determining the aggregation mode, are to:
determine whether to permit the device or another device to operate in the aggregation mode based on the information; and
permit the device or the another device to operate in the aggregation mode based on determining whether to permit the device or the another device to operate in the aggregation mode.

4. The device of claim 1, where the one or more processors are further to:
determine whether the information satisfies a threshold; and
determine whether the multiple channels are available based on determining whether the information satisfies the threshold.

5. The device of claim 1, where the one or more processors are further to:
perform a comparison of first information related to the first channel of the one or more channels and second information related to the second channel of the one or more channels; and
determine the order related to the one or more channels based on performing the comparison.

6. The device of claim 1, where the information includes information identifying:
an RSSI value associated with the multiple channels,
a signal-to-interference-plus-noise ratio (SINR) value associated with the multiple channels,
an amount of traffic on the multiple channels,
an amount of radiated power permitted when communicating via the multiple channels, or
the multiple radio bands.

7. The device of claim 1, where the aggregation mode includes:
an enhanced license assisted access (eLAA) aggregation mode.

8. A non-transitory computer-readable medium storing instructions, the instructions comprising:
one or more instructions that, when executed by one or more processors, cause the one or more processors to:
receive information related to a first channel,
the information including:
a received signal strength indicator (RSSI) value associated with the first channel,
a signal-to-interference-plus-noise ratio (SINR) value associated with the first channel,
an amount of traffic on the first channel, or
an amount of radiated power permitted for the first channel;
determine an aggregation mode of one or more aggregation modes based on receiving the information;
determine a set of available channels that includes the first channel based on receiving the information,
the set of available channels being determined based upon the set of available channels meeting a threshold;
determine a first score of the first channel,
the first score being determined based upon at least one of:
information related to the RSSI value of the first channel,
information related to an amount of traffic of the first channel, or
information related to an amount of power associated with the first channel;
determine a second score of a second channel of the set of available channels,
the second score being determined based upon at least one of:
information related to an RSSI value of the second channel,
information related to an amount of traffic of the second channel, or
information related to an amount of power associated with the second channel;
determine a first weighted score for the first channel based upon weighting the first score in association with a first particular radio band associated with the first channel;
determine a second weighted score for the second channel based upon weighting the second score in association with a second particular radio band associated with the second channel,
the first score for the first channel associated with the first particular radio band being weighted more than the second score for the second channel associated with the second particular radio band;
determine an order related to the first channel and the second channel,
the order being based on comparing the first weighted score of the first channel to the second weighted score of the second channel,
the comparison indicating that the first weighted score is more than the second weighted score;
select the first channel based on the first weighted score being more than the second weighted score; and
provide or receive communications via the first channel based on selecting the first channel.

9. The non-transitory computer-readable medium of claim 8, where the one or more instructions, when executed by the one or more processors, further cause the one or more processors to:
receive additional information related to the first channel or the second channel after selecting the first channel;
re-determine the set of available channels based on receiving the additional information; and
select another channel from the set of available channels based on re-determining the set of available channels.

10. The non-transitory computer-readable medium of claim 8, where the one or more instructions, that cause the one or more processors to determine the aggregation mode, cause the one or more processors to:

determine a capability of a device or another device based on other information,
the capability being related to whether the device or the another device can operate in:
a long-term evolution wireless local area network aggregation (LWA) aggregation mode of the one or more aggregation modes,
a license assisted access (LAA) aggregation mode of the one or more aggregation modes, or
both the LWA aggregation mode and the LAA aggregation mode;
determine whether to permit the device or the another device to operate in the aggregation mode based on determining the capability of the device or the another device; and
where the one or more instructions, when executed by the one or more processors, further cause the one or more processors to:
permit the device or the another device to operate in the aggregation mode based on determining whether to permit the device or the another device to operate in the aggregation mode.

11. The non-transitory computer-readable medium of claim 8, where the one or more instructions, when executed by the one or more processors, are further to:
determine a first weight for the first score based on a channel identifier of the first channel;
determine the first weighted score for the first channel based on determining the first weight; and
where the one or more instructions, that cause the one or more processors to determine the order, cause the one or more processors to:
determine the order related to the first channel based on the first weighted score.

12. The non-transitory computer-readable medium of claim 8, where the one or more instructions, when executed by the one or more processors, further cause the one or more processors to:
determine a first weight for the first score based on a frequency of the first channel,
the frequency being related to the first particular radio band of the first channel;
determine the first weighted score for the first channel based on determining the first weight; and
where the one or more instructions, that cause the one or more processors to determine the order, cause the one or more processors to:
determine the order related to the first channel based on the first weighted score.

13. The non-transitory computer-readable medium of claim 8, where the one or more instructions, when executed by the one or more processors, further cause the one or more processors to:
determine that the order related to the first channel of the set of available channels and the second channel of the set of available channels fails to indicate whether the first channel is to be selected before the second channel based on determining the order;
determine that the first channel is adjacent, in a frequency spectrum, to an unavailable channel based on the information; and
where the one or more processors are further to:
select the second channel based on the first channel being adjacent, in the frequency spectrum, to the unavailable channel.

14. The non-transitory computer-readable medium of claim 8, where:

the order is related to multiple channels, and
where the one or more instructions, that cause the one or more processors to select the first channel, cause the one or more processors to:
select the multiple channels based on the order being related to the multiple channels.

15. A method, comprising:
receiving, by a device, information related to a plurality of channels,
the information indicating whether a measurement related to the plurality of channels satisfies a threshold,
the threshold being related to an availability of the plurality of channels;
determining, by the device, an aggregation mode to use to communicate via the plurality of channels;
determining, by the device, a set of available channels from the plurality of channels based on determining whether the measurement satisfies the threshold,
the set of available channels being determined based upon the set of available channels meeting a threshold;
determining, by the device, a first score of a first channel of the one or more channels of the multiple channels,
the first score being determined based upon at least one of:
information related to an RSSI value of the first channel,
information related to an amount of traffic of the first channel, or
information related to an amount of power associated with the first channel;
determining, by the device, a second score of a second channel of the one or more channels of the multiple channels,
the second score being determined based upon at least one of:
information related to an RSSI value of the second channel,
information related to an amount of traffic of the second channel, or
information related to an amount of power associated with the second channel;
determining, by the device, a first weighted score for the first channel based upon weighting the first score in association with a first particular radio band associated with the first channel;
determining, by the device, a second weighted score for the second channel based upon weighting the second score in association with a second particular radio band associated with the second channel,
the first score for the first channel associated with the first particular radio band being weighted more than the second score for the second channel associated with the second particular radio band;
determining, by the device, an order related to the first channel and the second channel,
the order being based on comparing the first weighted score of the first channel and the second weighted score of the second channel,
the comparison indicating that the first weighted score is more than the second weighted score;
selecting, by the device, the first channel from the set of available channels based on the first weighted score being more than the second weighted score; and
exchanging, by the device, communications via the first channel based on selecting the first channel.

16. The method of claim 15, further comprising:
receiving additional information related to the set of available channels or the plurality of channels;
determining whether to modify the set of available channels or the order related to the set of available channels based on the additional information; and
where selecting the first channel comprises:
selecting the first channel based on determining whether to modify the set of available channels or the order related to the set of available channels.

17. The method of claim 15, where determining the aggregation mode comprises:
determining whether to permit the device or another device to communicate via the plurality of channels using the aggregation mode based on the information, the information identifying:
a first quantity of devices that can communicate via the plurality of channels using the aggregation mode,
a second quantity of devices that can communicate via the plurality of channels using another aggregation mode,
a quantity of available channels, or
a bandwidth capability of the device, the first quantity of devices, or the second quantity of devices; and
permitting the device or the another device to communicate via the plurality of channels using the aggregation mode based on determining whether to permit the device or the another device to communicate via the plurality of channels using the aggregation mode.

18. The method of claim 15, further comprising:
performing a comparison of the first score for the first channel of the set of available channels and the second score for the second channel of the set of available channels,
the first score and the second score being based on the information; and
where determining the order comprises:
determining a first order for the first channel and a second order for the second channel based on a result of the comparison of the first score and the second score.

19. The method of claim 15, further comprising:
determining that the first channel of the set of available channels and the second channel of the set of available channels have a same order based on determining the order; and
where selecting the first channel comprises:
selecting the first channel based on the first channel being associated with the first particular radio band.

20. The method of claim 15, further comprising:
performing a listen-before-talk mechanism or a clear channel assessment based on selecting the first channel;
determining that the first channel is not available during a time period based on performing the listen-before-talk mechanism or the clear channel assessment; and
selecting another channel based on determining that the first channel is not available.

* * * * *